Jan. 13, 1931. E. REGESTER 1,788,779
SPRINKLER
Filed Aug. 12, 1927
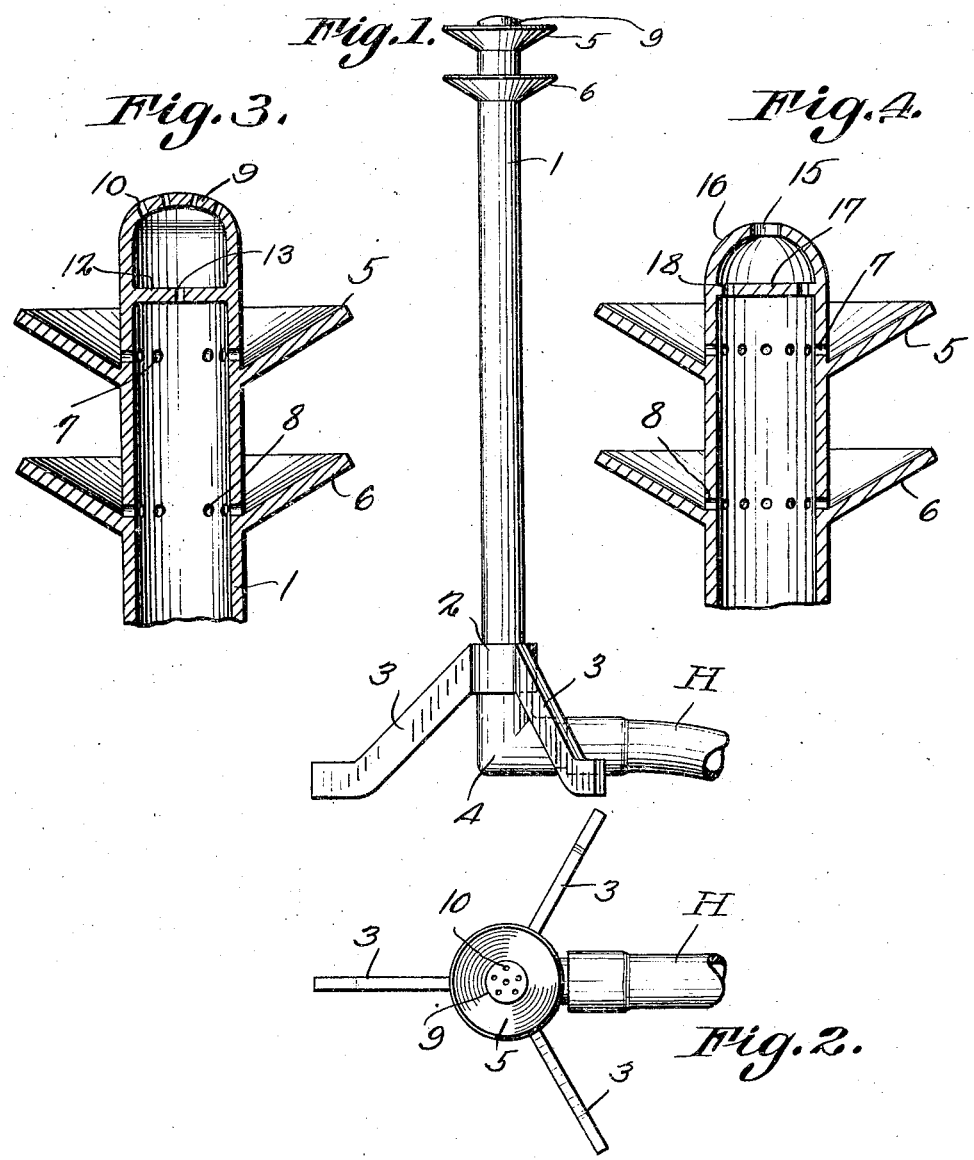
E. Regester
Inventor
By C.A.Snow&Co.
Attorneys.

Patented Jan. 13, 1931

1,788,779

UNITED STATES PATENT OFFICE

EDDIE REGESTER, OF NORTON, KANSAS

SPRINKLER

Application filed August 12, 1927. Serial No. 212,563.

This invention relates to lawn sprinklers, one of the objects being to provide a simple and efficient device of this character which, when set up on a lawn will deliver a fine spray covering a wide area without requiring the use of movable parts.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred forms of the invention have been shown.

In said drawings,

Figure 1 is an elevation of a sprinkler embodying the present improvements.

Figure 2 is a top plan view thereof.

Figure 3 is an enlarged vertical section through the upper portion of the sprinkler.

Figure 4 is a view similar to Figure 3 showing a slightly modified construction.

Referring to the figures by characters of reference 1 designates a short stand pipe the lower end portion of which is provided with a collar 2 having a leg 3 extending downwardly therefrom adapted to rest on the ground for the purpose of holding the pipe 1 in an upstanding position. A suitable fitting, such as an elbow 4, is connected to the lower end of the pipe and is adapted to be coupled in any suitable manner to one end of a flexible hose indicated at H.

Extending around the upper portion of the pipe 1 are superposed flanges 5 and 6 each of which is flared upwardly so as to provide an annular gutter. An annular series of apertures 7 is formed in the wall of the pipe 1 and opens into the lower portion of the upper gutter formed by flange 5 while another annular series of apertures 8 opens into the lower portion of the gutter formed by the flange 6. The top of the pipe 1 is closed as shown at 9 and, in the structure illustrated in Figure 3, has a plurality of small apertures 10 opening therethrough.

It will be obvious that when water under pressure is directed from the hose H into the pipe 1 it will be expelled in the form of minute jets issuing from the apertures 7 and 8 and also from the apertures 10. The jets issuing from the apertures 10 will be directed upwardly from the pipe while the jets issuing from the apertures 7 and 8 will strike the upper or inner surfaces of the flanges 5 and 6 and each jet will thus be spread by the flange so as to produce a fan spray. The numerous fan sprays thus produced, cooperating with the jets issuing from the apertures 10, will enable the sprinkler to cover a large area with a fine mist-like spray. The upper end portion of the fan pipe as illustrated in Figure 3 is rounded and a partition 12 is arranged across the upper portion of the pipe below this rounded end. A single central aperture 13 can be formed in the partition 12 while the apertures 10 can diverge upwardly. With this arrangement water directed into the stand pipe will flow through the aperture 13 and thence outwardly through the diverging apertures 10, thus increasing the efficiency of the sprinkler to a great extent. This construction can be reversed as shown in Figure 4 wherein a large central aperture 15 is provided in the rounded top 16 of the stand pipe while the partition 17 has a plurality of apertures 18. In all other respects the modified structures shown in Figure 4 is similar to the one shown in Figures 1, 2 and 3, each pipe having the superposed flanges 5 and 6 and the apertures 7 and 8 for directing jets thereagainst.

It will be noted that this device is cheap to manufacture and can be set up readily for use.

What is claimed is:

A lawn sprinkler formed in one piece and including a pipe having a relatively small orifice in its outlet end, a partition separating the apertured portion of said pipe from the remainder thereof, said partition being apertured to establish communication between said apertured portion of the pipe and said remainder thereof, said communicating means being restricted relative to said oriffice for reducing pressure of water supplied to the orifice, and superposed annular flanges integral with the pipe and flared upwardly to provide continuous gutters around the pipe of uniform depth, the said flanges being parallel, there being radial apertures in the pipe opening into the lower portions of the respective gutters, the apertured partition being interposed between said apertures and the orifice in the end of the pipe.

In testimony that I claim the foregoing as my own, I have hereto affixed my signature.

EDDIE REGESTER.